US011674847B2

(12) United States Patent  
Li et al.

(10) Patent No.: US 11,674,847 B2  
(45) Date of Patent: Jun. 13, 2023

(54) SYSTEM AND METHOD FOR RAPID AND ACCURATE TRACE GAS MEASUREMENT

(71) Applicant: Thermo Fisher Scientific Inc., Franklin, MA (US)

(72) Inventors: Yongquan Li, Schenectady, NY (US); Corsino Lopes, Providence, RI (US)

(73) Assignee: Thermo Fisher Scientific Inc., Franklin, MA (US)

(*) Notice: Subject to any disclaimer, the term of this patent is extended or adjusted under 35 U.S.C. 154(b) by 657 days.

(21) Appl. No.: 16/687,903

(22) Filed: Nov. 19, 2019

(65) Prior Publication Data

US 2020/0158570 A1 May 21, 2020

Related U.S. Application Data

(60) Provisional application No. 62/770,411, filed on Nov. 21, 2018.

(51) Int. Cl.
    *G01J 3/10* (2006.01)
    *G01N 21/39* (2006.01)
    (Continued)

(52) U.S. Cl.
    CPC .............. *G01J 3/10* (2013.01); *G01J 3/4338* (2013.01); *G01N 21/3504* (2013.01); *G01N 21/39* (2013.01)

(58) Field of Classification Search
    CPC ...... G01J 3/10; G01J 3/4338; G01N 21/3504; G01N 21/39
    See application file for complete search history.

(56) References Cited

U.S. PATENT DOCUMENTS 5,838,008 A    11/1998   Esler et al.  
5,991,032 A    11/1999   Atkinson et al.  
(Continued)

FOREIGN PATENT DOCUMENTS

CN      102798610 A    11/2012  
JP       2791275 B2 *   8/1998  ............. G01B 11/00  
(Continued)

OTHER PUBLICATIONS

Andersson, M., "Development of Laser Spectroscopy for Scattering Media Applications", Dec. 31, 2007, retrieved from online on Oct. 18, 2017; retrieved from URL:http://www.atomic.physics.lu.se/fileadmin/_migrated/content_uploads/Mats_Andersson_thesis2007.pdf.

(Continued)

*Primary Examiner* — Jamil Ahmed

(57) ABSTRACT

An embodiment of a system for measuring trace gas concentration is described that comprises a laser absorption spectrometer configured to detect an absorbance measure from a trace gas, as well as a temperature value and a pressure value that correspond to an environment in a gas cell; and a computer having executable code stored thereon configured to perform a method comprising: receiving the absorbance value, the temperature value, and the pressure value; defining a fitting range associated with the trace gas; applying a curve fitting model in the fitting range to the absorbance value using the temperature value and the pressure value as model parameters; and producing a concentration measure of the trace gas.

18 Claims, 6 Drawing Sheets

(51) Int. Cl.
*G01J 3/433* (2006.01)
*G01N 21/3504* (2014.01)

(56) References Cited

U.S. PATENT DOCUMENTS

| | | | |
|---|---|---|---|
| 6,067,989 A | 5/2000 | Katzman | |
| 6,075,252 A | 6/2000 | Atkinson et al. | |
| 6,396,056 B1 | 5/2002 | Lord et al. | |
| 6,885,965 B2 | 4/2005 | Butler et al. | |
| 7,192,782 B2 | 3/2007 | Roller et al. | |
| 7,265,842 B2 | 9/2007 | Paldus et al. | |
| 7,704,301 B2 | 4/2010 | Zhou et al. | |
| 7,969,576 B1 | 6/2011 | Buckley et al. | |
| 8,358,417 B2 | 1/2013 | Feitisch et al. | |
| 8,953,165 B2 | 2/2015 | Feitisch et al. | |
| 8,976,358 B2 | 3/2015 | Feitisch et al. | |
| 8,982,352 B1 | 3/2015 | Hoffnagle et al. | |
| 9,360,415 B2 | 6/2016 | Liu et al. | |
| 9,651,488 B2 | 5/2017 | Scherer et al. | |
| 9,671,333 B2 | 6/2017 | Hirata et al. | |
| 9,772,277 B2 | 9/2017 | Muramatsu et al. | |
| 2008/0255769 A1* | 10/2008 | Zhou | G01N 21/3504 702/24 |
| 2009/0164138 A1* | 6/2009 | Goto | G01N 21/3504 356/438 |
| 2011/0270113 A1 | 11/2011 | Heyne et al. | |
| 2012/0062895 A1 | 3/2012 | Rao | |
| 2012/0287418 A1 | 11/2012 | Scherer et al. | |
| 2014/0049777 A1 | 2/2014 | Sun et al. | |
| 2014/0067282 A1* | 3/2014 | Beyer | G01J 3/28 702/24 |
| 2015/0338342 A1 | 11/2015 | Muramatsu et al. | |
| 2017/0038257 A1* | 2/2017 | Liu | G01J 3/28 |
| 2017/0212042 A1 | 7/2017 | Angelosante et al. | |
| 2018/0120159 A1† | 5/2018 | Liu | |
| 2018/0195905 A1 | 7/2018 | Poole et al. | |
| 2018/0306713 A1 | 10/2018 | Rao et al. | |

FOREIGN PATENT DOCUMENTS

| | | |
|---|---|---|
| JP | 2017173162 A | 9/2017 |
| WO | WO-2018135619 A1 | 7/2018 |

OTHER PUBLICATIONS

PCT/US2019/061617, Search Report and Written Opinion, dated Jan. 31, 2020.
EP19886974.5, Extended European Search Report, dated Jul. 4, 2022, 10 pages.
Gardiner T., et al., "A Lightweight Near-Infrared Spectrometer for the Detection of Trace Atmospheric Species," Review of Scientific Instruments, Aug. 3, 2010, vol. 81, No. 8, XP012145986, pp. 083102-1-083102-11.

* cited by examiner
† cited by third party

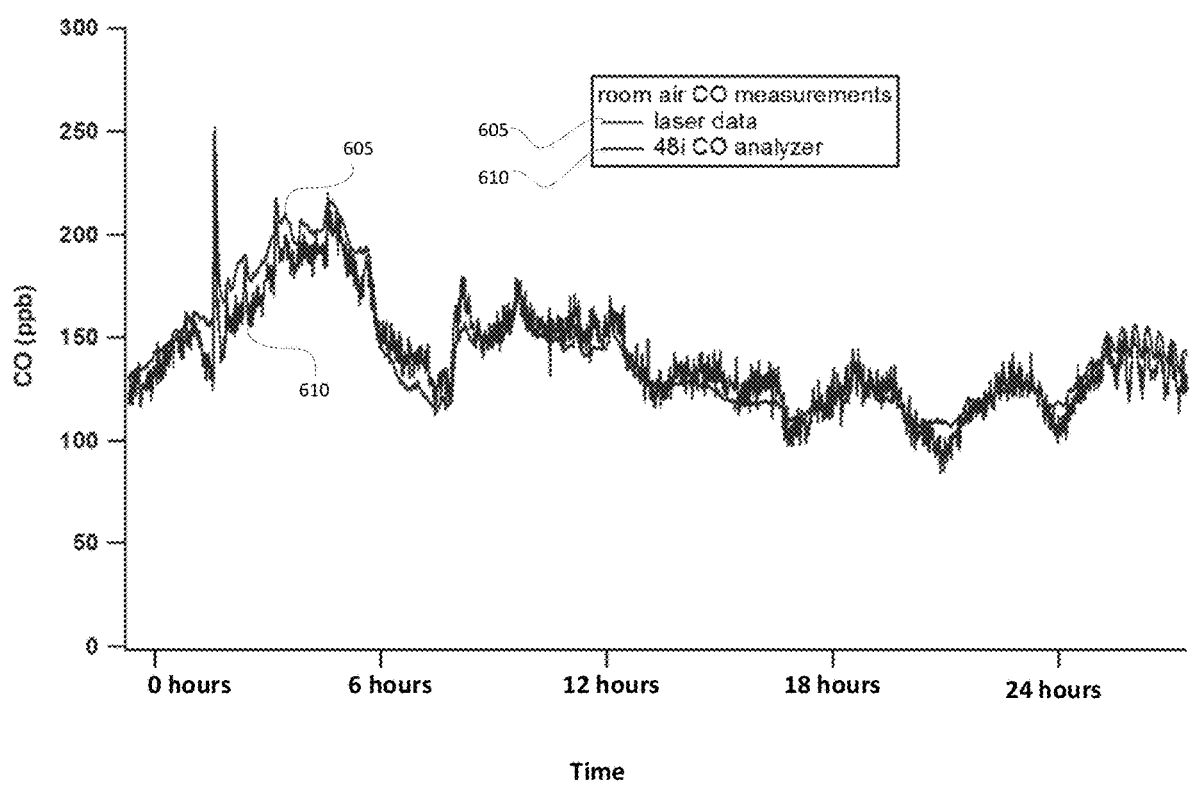

SYSTEM AND METHOD FOR RAPID AND ACCURATE TRACE GAS MEASUREMENT

CROSS-REFERENCE TO RELATED APPLICATIONS

The present application claims the priority benefit from U.S. Patent Application Ser. No. 62/770,411, filed Nov. 21, 2018, which is hereby incorporated by reference herein in its entirety for all purposes.

FIELD OF THE INVENTION

The present invention is generally directed to rapid and accurate measurements of trace gas made using high resolution laser spectrometers.

BACKGROUND

It is generally appreciated that high resolution laser absorption spectrometers, including mid IR QC laser based instruments have been utilized to measure part per billion (e.g. ppb) and sub ppb level of trace gases. The term "trace gas" as used herein includes a gas that is present at 1% or less of the volume of gas in the atmosphere. Examples of trace gases include, but are not limited to, argon, ozone, sulfur dioxide, nitrogen dioxides, carbon dioxide, methane, and carbon monoxide.

To detect specific gas molecules using laser absorption spectrometers, a laser is employed that produces a strong absorption line for one or more types of gas. The relationship of laser to strength of the absorption line may be identified using various methods such as, for example, a database simulation using information stored in what is referred to as the high-resolution transmission molecular absorption database (e.g. HITRAN) supported by the Atomic and Molecular Physics Division, Harvard-Smithsonian Center for Astrophysics. The terms "strength of the line" or "line strength", as used herein, are used according to the understanding of those of ordinary skill in the art and typically refer to the intensity that gives a measure of the total absorption associated with the line. For example, in some applications the laser is tuned through the targeted frequency using well controlled current sweep and temperature settings. Then the laser beam is directed into what is referred to as a multiple pass gas cell that contains a concentration of one or more types of gas, and the change in laser intensity caused by the target gas absorption is measured by a detection system and used to produce a spectrum representative of the target gas. Examples of laser absorption spectrometers are described in U.S. Pat. Nos. 7,704,301 and 8,976,358 each of which are hereby incorporated by reference herein in its entirety for all purposes.

Those of ordinary skill in the art appreciate that there are a number of different approaches known for processing the measured spectrum to determine the concentration of the one or more types of gas, which may depend, at least in part, on the laser modulation technologies used for the measurement. For example, in one approach the laser is modulated using what is referred to as a fast "wavelength scanning" technique and the absorption peak area is either integrated or model fitted to report the mixing ratio of the measured gas molecule. In general, what is referred to as a "Voigt line shape profile" may be integrated with a known line strength for a type of gas (e.g. may be obtained from the HITRAN database) to establish a curve fitting model. The term "Voigt profile", as used herein, generally refers to a probability distribution that is a convolution of a Gaussian profile and a Lorentzian profile. When applied to a running system, the time domain curve fitting model is needed in order to promptly process the spectrum signals, which are acquired at a very high speed.

There have been numerous curve fitting methods derived from the Voigt profile to address measurement accuracy and computation time. Among them, a numeric solution of Voigt line shape profiles is considered to be the most accurate. However, it requires significantly long computation times, which are not ideal for a fast gas sensing system. Also, current approaches generally fail to address hardware related issues which significantly degrade system performance, examples of which include factors such as laser instability and current noise. Potentially, any limitation can cause the failure of the curve fitting model such as, for example, embodiments of laser absorption spectrometer system that rely on the presence of at least some trace of target gas in the sample stream to locate the peak and for the curve fitting algorithm to function correctly. In the present example, running a true "zero" test of the system is not possible in these systems because the curve fitting model would crash.

Therefore, there is a need for an improved design that increases the speed and reliability of trace gas measurements made using high resolution laser absorption spectrometers.

SUMMARY

Systems, methods, and products to address these and other needs are described herein with respect to illustrative, non-limiting, implementations. Various alternatives, modifications and equivalents are possible.

An embodiment of a system for measuring trace gas concentration is described that comprises a laser absorption spectrometer configured to detect an absorbance measure from a trace gas, as well as a temperature value and a pressure value that correspond to an environment in a gas cell; and a computer having executable code stored thereon configured to perform a method comprising: receiving the absorbance value, the temperature value, and the pressure value; defining a fitting range associated with the trace gas; applying a curve fitting model in the fitting range to the absorbance value using the temperature value and the pressure value as model parameters; and producing a concentration measure of the trace gas.

Additionally, an embodiment of a method for measuring trace gas concentration is described that comprises receiving an absorbance value from a trace gas, as well as a temperature value and a pressure value that correspond to an environment in a gas cell; defining a fitting range associated with the trace gas; applying a curve fitting model in the fitting range to the absorbance value using the temperature value and the pressure value as model parameters; and producing a concentration measure of the trace gas.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

FIG. 6 is a simplified graphical representation of one embodiment of a comparison of carbon monoxide measurements between a commercial instrument and a system using the method of FIG. 2.

Like reference numerals refer to corresponding parts throughout the several views of the drawings.

DETAILED DESCRIPTION OF EMBODIMENTS

As will be described in greater detail below, embodiments of the described invention include a fast data processing system and method that improves the speed and reliability of trace gas measurements made using conventional high resolution laser absorption spectrometers.

Figure 1:
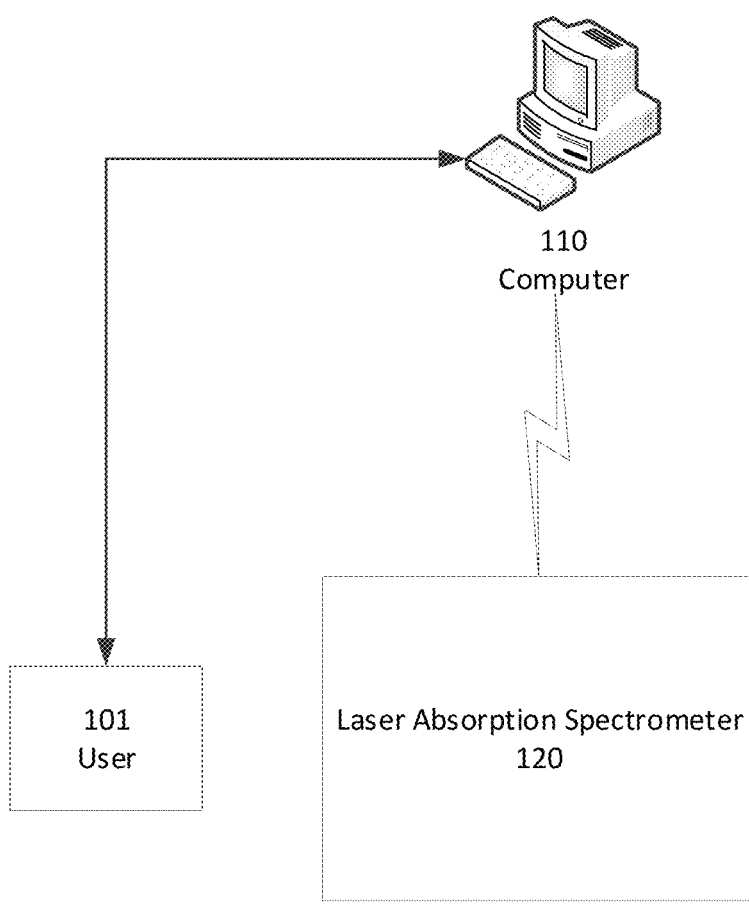
FIG. 1 is a simplified graphical representation of one embodiment of a laser absorption spectrometer and associated computer system.

FIG. 1 provides a simplified illustrative example of user 101 capable of interacting with computer 110, as well as a network connection between computer 110 and laser absorption spectrometer 120 that may include one or more substantially air tight chambers or other suitable receptacle configured to enable laser absorption spectrometer 120 to analyze one or more types of gas. There are many configurations of gas cell known in the related art that generally include one or more optically transmissive windows which allow a laser beam to pass through without significant attenuation or alteration of the beam (e.g. power, wavelength filtering, etc.). Additional examples of laser absorption spectrometer and gas cell configurations are described in U.S. Pat. Nos. 7,704,301, and 8,976,358 incorporated by reference above.

It will also be appreciated that the example of FIG. 1 illustrates a direct network connection between the elements (e.g. including wired or wireless data transmission represented by a lightning bolt), however the exemplary network connection also includes indirect communication via other devices (e.g. switches, routers, controllers, computers, etc.) and therefore should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many various types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the invention include a system that implements an accurate curve fitting model used to efficiently process the absorption spectrum data generated by laser absorption spectrometers integrated with a gas cell (e.g. a multiple pass gas cell). For example, using the detector signal, the gas cell pressure, and the temperature within the gas cell as input parameters, the system is able to rapidly report the measured concentration of one or more trace gases. Specifically, embodiments of the system described herein may report data at a rate that is faster than 10 Hz.

For example, embodiments of the system compensate for variations in pressure and temperature and implement current noise line broadening and peak tracking functions. Importantly, variation in temperature and/or pressure each have an impact on the peak height and peak width of the line shape. In the present example, the absorption line shape is affected by the relative pressure within the gas cell, where an increase in gas cell pressure causes a corresponding broadening of the peak width. Temperature also has an impact on the line shape where an increase in temperature also causes the peak width to be broaden, and the effect becomes increasingly greater as the pressure in the gas cell is reduced (e.g. temperature changes have the greatest effect in a vacuum).

In the embodiments described herein, the system employs a curve fitting model that assesses the line shape using a combination of a Gauss profile analysis technique which is temperature dependent, and Lorentz profile analysis technique which is pressure dependent. Therefore, the system can compensate for both the temperature and pressure dependent factors that affect the line shape. Additionally, the curve fitting model includes one or more parameters that account for effects associated with other components of laser absorption spectrometer 120 that can also cause line broadening such as, for instance, current noise that causes distortion of the line profile. Further, the described curve fitting model enables an "absolute measurement approach" which eliminates the necessity of frequent instrument calibration against a certified gas cylinder.

Importantly, the system produces the results using significantly less computation time that other known methods which provides user 101 highly accurate, real-time actionable information. The term "real-time" as used herein typically refers to reporting, depicting, or reacting to events at the same rate and sometimes at the same time as they unfold (e.g. within a few seconds or fractions of a second). For example, in the described embodiments the computation time for each determination of trace gas concentration is under 10 micro seconds, which is short enough that it is not a limiting factor relative to the hardware data acquisition rate (e.g. the computation time is shorter than the hardware data acquisition rate). This enables the system to operate in what is referred to as "time domain" format that enables analysis of the measured signals as they are acquired over time and thus direct application of the results while the system is in operation.

Further, embodiments of the presently described invention are capable of processing spectrum data from below a baseline noise level of about 0.00001 absorption units (base e) up to the upper limit of the measurement range of laser absorption spectrometer 120 of about 2.3 absorption units (base e).

Also, as described above some embodiments of the invention include features that address sources of error associated with one or more elements of the system. For example, embodiments of the invention address current noise and/or include an auto peak tracking feature that compensates for laser source instability which may result from problems with the laser hardware control system. It is generally appreciated that some laser source instability may be characterized by irregular peaks and troughs of the light emission patterns from the laser source. This type of instability is seen in some hardware control systems where peak shift is a common issue and laser performance degraded, generally resulting in the higher current noise. For example, current noise typically results in broadening of the peak width, and temperature changes associated with poor control typically results in a shift of the peak position in the spectrum. Current noise can create what is referred to as line broadening such as extra line broadening which distorts the line shape and causes inaccurate measurements. (e.g. other than of Gaussian or Lorentzian types of line broadening), in addition to conventional molecule self-broadening and pressure broadening (sometimes referred to as "current noise broadening").

In the presently described embodiments of the invention, a unique laser peak auto tracking function is used that allows the curve fitting model to track down any shift in the position of the peak in the spectrum. Therefore, the potential step change in the measurement results or other systematic errors can be avoided. For example, the curve fitting model expects that the peak position for a gas is at a known location in the spectrum. In some embodiments it is desirable to perform a periodic check for a shift of the position of the peak to a different range, and if a shift has occurred tune the laser so that the peak is located back to the known position for the gas. However, such periodic tuning results in undesirable step changes on the data stream. In the embodiments described herein, the curve fitting model utilizes a "floating" range that finds the position of the peak based on the least square fit. Also in the same or alternative embodiments, the curve fitting model includes one or more parameters that address current noise broadening.

In the embodiments described herein, the curve fitting model was created from what is referred to as the fundamental photon budget following Beer's Law. Those of ordinary skill in the related art appreciate that Beer's Law relates to the rate of power attenuation of light passing through a material over a unit of distance.

For example, embodiments of the presently described invention implement the following curve fitting model:

$$f(t)=S(T)\Gamma(P,T,v)v(t)N(p,T)$$

Where the f(t) is the curve fitting model, convoluted with four terms; S(T), $\Gamma(P,T,v)$, v(t) and N(p,T).

S(T), is the temperature dependent line strength $\Gamma(P,T,v)$, is the line shape profile, including current noise related broadening.

v(t), is the conversion of time domain to frequency domain.

N(p,T), is the number of molecules as function of pressure and temperature.

Figure 2:
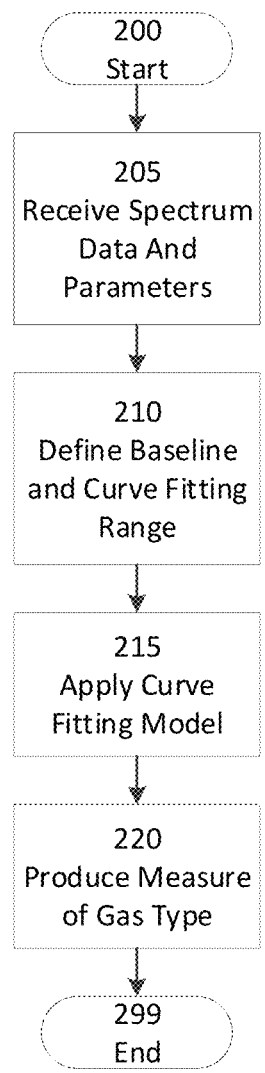
FIG. 2 is a simplified graphical representation of one embodiment of a method performed by the computer system of claim 1 with executable code for implementing a method for applying a curve fitting model.

In the embodiments described herein, computer 110 receives absorption values as data from laser absorption spectrometer 120 and applies a curve fitting model to the data. For example, FIG. 2 illustrates a method executed by the processor of computer 110. First, as illustrated in step 205, the processor receives spectrum data (e.g. measured absorption values associated with a gas in the gas cell) from laser absorption spectrometer 120 as well as other parameters related to the environment within the gas cell that include a temperature value and a pressure value. Next, as illustrated in step 210, the processor defines what is referred to as a baseline and curve fitting range for the spectrum data. For example, for computational efficiency it is important to process data only in the range that most likely includes the measured absorption peak. The absorption peak for the trace gases of interest are known and therefore processing data in the region of one or more known absorption peaks is desirable. One possible range could include a range of about 90-220 t(us) which correlates to a known trace gas.

The processor then applies the curve fitting model to the spectrum data as illustrated in step 215, using the gas cell pressure and temperature values. During the curve fitting process, the processor tracks the position of the peaks in the spectrum and determines if any peak shifts have occurred. For example, during the curve fitting process the processor first checks the position of the peak position in the range of the spectrum, and if the processor determines that there is a shift in the position of the peak that is above a threshold (e.g. a shift that is ≥about 10 channels) then the processor tunes the laser to bring the position of the peak to the acceptable range for the gas (e.g. the known position for the gas). As described above, the curve fitting model accounts for the real peak position to give the most accurate result.

Last, as illustrated in step 220, the processor produces a value of concentration for each of the trace gases known to be in the sample and measured by laser absorption spectrometer 120.

EXAMPLES

Figure 3:
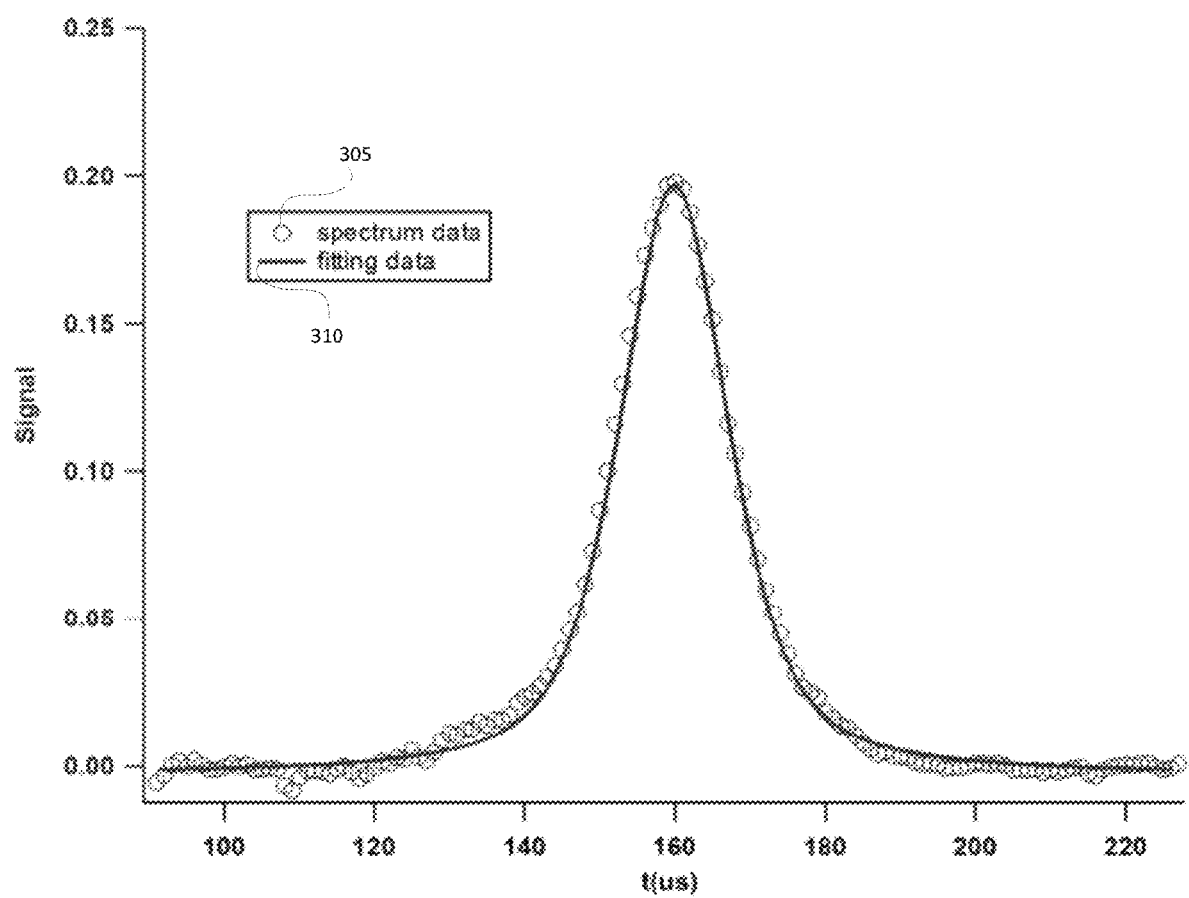
FIG. 3 is a simplified graphical representation of one embodiment of data fitted using the method of FIG. 2.

FIG. 3 provides an illustrative example of results obtained from applying the curve fitting model (fitting data line 310) to a plurality of measured signals in the spectrum data (spectrum data 305). In the example of FIG. 3, the fitting model matched the spectrum data very tightly showing measured signals having a laser peak position at about 160 t(us) (e.g. the channel number defined by the detector and the laser ramping configuration in microseconds) which correlated to the expected value of Carbon Monoxide (CO) trace gas provided from a certified gas cylinder. Under the experimental conditions, the current noise broadening was 0.01 cm-1 at half width of half maximum, and the method automatically tracked down the spectrum peak position.

Figure 4:
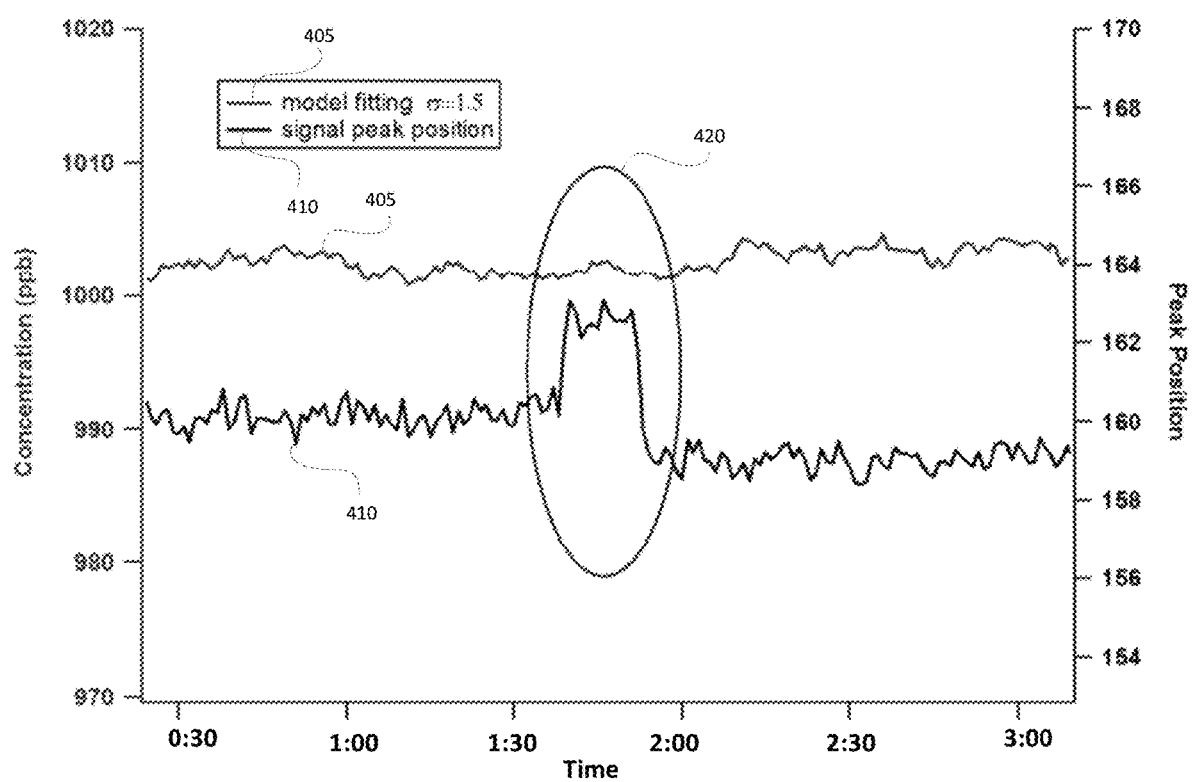
FIG. 4 is a simplified graphical representation of one embodiment of a peak tracking function of the method of FIG. 2.

Next, FIG. 4 provides an illustrative example of a laser peak position shift that has no impact on the measurement results. In the example, model fitting line 405 shows the curve fitting results that align with the concentration values on left axis, and laser peak position line 410 aligns with the peak position values on right axis. When the laser peak position shifts up to 4 digits, indicated by the region indicated within circle 420, the peak tracking feature of the curve fitting model successfully minimized the impact on the same region of model fitting line 405 and thus the concentration reading. Without the peak tracking function of the curve fitting model, the step change in peak position would be expected to be reflected in model fitting line 405 and impact the measurement results.

Figure 5:
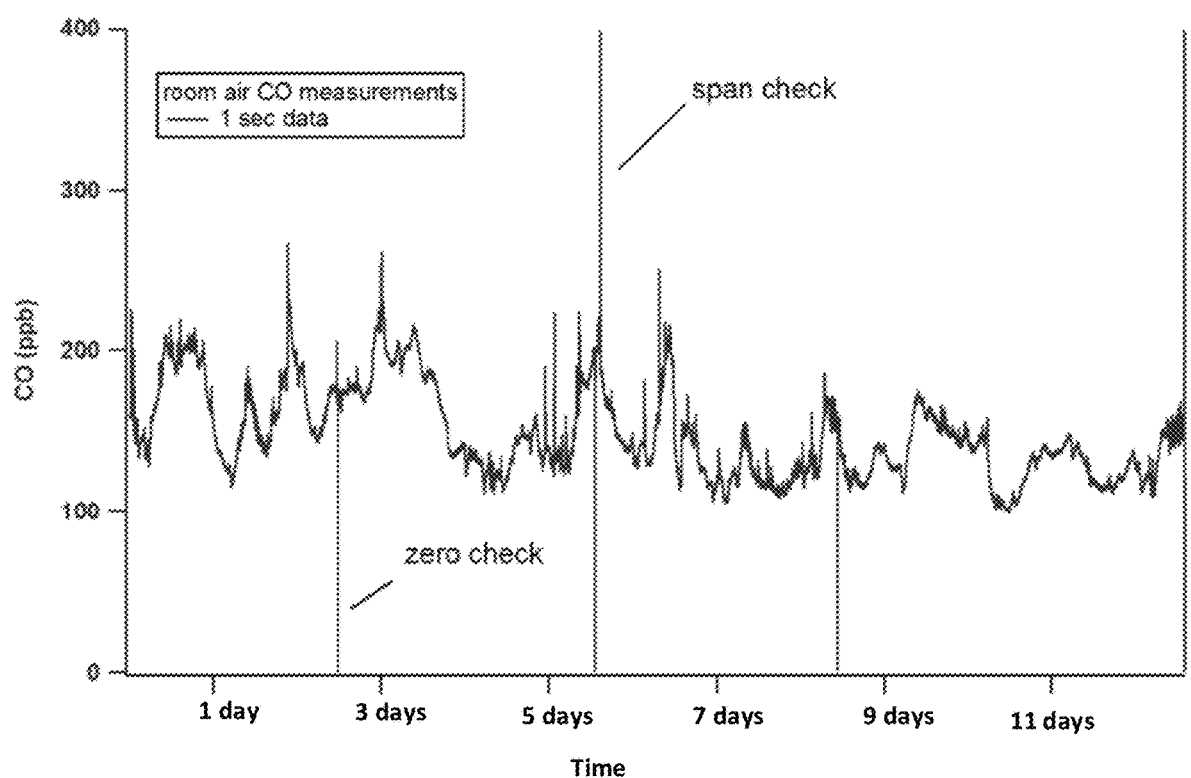
FIG. 5 is a simplified graphical representation of one embodiment of measurements of carbon monoxide over 11 days using the method of FIG. 2.

FIG. 5 provides an illustrative example of Carbon Monoxide (CO) air measurements made in a room over an 11 day period. In the example of FIG. 5, the laser system was set up to measure room air CO concentrations over the 11 day span with periodic checks using what is referred to as "zero air" (e.g. no trace gas content) and "span gas" (e.g. a known content of CO trace gas). Notably, the system using the curve fitting method provided reliable and accurate results.

Last, FIG. 6 provides an illustrative example of a comparison of trace gas measurement performance between a system implementing the curve fitting method described herein and an existing commercial instrument (e.g. a 48i CO gas analyzer available from Thermo Fisher Scientific). Importantly, FIG. 6 illustrates comparable results of CO room air measurements using the described invention illustrated as laser data line 605, and 48i line 610 measured by the commercial 48i CO gas analyzer. Importantly, while the trace gas measurement values are comparable, the commercial 48i CO gas analyzer does not have the capability to operate in the "time domain" or to compensate for pressure and temperature variations and implement current noise line broadening and peak tracking functions as described above.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A system for measuring trace gas concentration, comprising:
    a laser absorption spectrometer configured to detect an absorbance value from a trace gas, as well as a temperature value and a pressure value that correspond to an environment in a gas cell; and
    a computer having executable code stored thereon, wherein the executable code is configured to perform a method comprising:
        receiving the absorbance value, the temperature value, and the pressure value;
        defining a fitting range associated with the trace gas;
        applying a curve fitting model in the fitting range to the absorbance value using the temperature value and the pressure value as model parameters; and
        producing a concentration measure of the trace gas;
    wherein,
        the computer performs the method over a computation time that is shorter than a data acquisition rate of the laser absorption spectrometer, and
        the computer operates in a time domain format that analyzes a plurality of absorbance as they are acquired over time and reports concentration measure of the trace gas in real-time.

2. The system of claim 1, wherein:
the curve fitting model comprises a peak tracking feature that compensates for laser source instability.

3. The system of claim 2, wherein:
the laser source instability results from problems with the laser hardware control system.

4. The system of claim 2, wherein:
the peak tracking feature finds the position of the peak using a least square fit.

5. The system of claim 1, wherein:
the curve fitting model comprises one or more parameters that address current noise broadening.

6. The system of claim 1, wherein:
the curve fitting model processes a range of the absorbance values from below a noise floor up to the upper limit of a measurement range of the laser absorption spectrometer.

7. The system of claim 1, wherein:
the trace gas is selected from the group consisting of argon, ozone, sulfur dioxide, nitrogen dioxides, carbon dioxide, methane, and carbon monoxide.

8. The system of claim 1, wherein:
the curve fitting model comprises a combination of a Gauss profile component that is temperature dependent and Lorentz profile component that is pressure dependent.

9. The system of claim 1, wherein:
the curve fitting model comprises $f(t)=S(T)\Gamma(P,T,v)v(t)N(p,T)$.

10. A method for measuring trace gas concentration, comprising:
    a) receiving an absorbance value from a trace gas, as well as a temperature value and a pressure value that correspond to an environment in a gas cell;
    b) defining a fitting range associated with the trace gas;
    c) applying a curve fitting model in the fitting range to the absorbance value using the temperature value and the pressure value as model parameters; and
    d) producing a concentration measure of the trace gas;
    wherein,
        a processor performs steps a-d over a computation time that is shorter than a data acquisition rate of a laser absorption spectrometer, and
        the processor operates in a time domain format that analyzes a plurality of the absorbance values as they are acquired over time and reports the concentration measure of the trace gas in real-time.

11. The method of claim 10, wherein:
the curve fitting model comprises a peak tracking feature that compensates for laser source instability.

12. The method of claim 11, wherein:
the laser source instability results from problems with the laser hardware control system.

13. The method of claim 11, wherein:
the peak tracking feature finds the position of the peak using a least square fit.

14. The method of claim 10, wherein:
the curve fitting model comprises one or more parameters that address current noise broadening.

15. The method of claim 10, wherein:
the curve fitting model processes a range of the absorbance values from below a noise floor up to the upper limit of a measurement range of the laser absorption spectrometer.

16. The method of claim 10, wherein:
the trace gas is selected from the group consisting of argon, ozone, sulfur dioxide, nitrogen dioxides, carbon dioxide, methane, and carbon monoxide.

17. The method of claim 10, wherein:
the curve fitting model comprises a combination of a Gauss profile component that is temperature dependent and Lorentz profile component that is pressure dependent.

18. The method of claim 10, wherein:
the curve fitting model comprises $f(t)=S(T)\Gamma(P,T,v)v(t)N(p,T)$.

* * * * *